Sept. 3, 1935.  K. E. STUART  2,013,453
CONTINUOUS HYDROLYZING PROCESS
Filed July 19, 1934
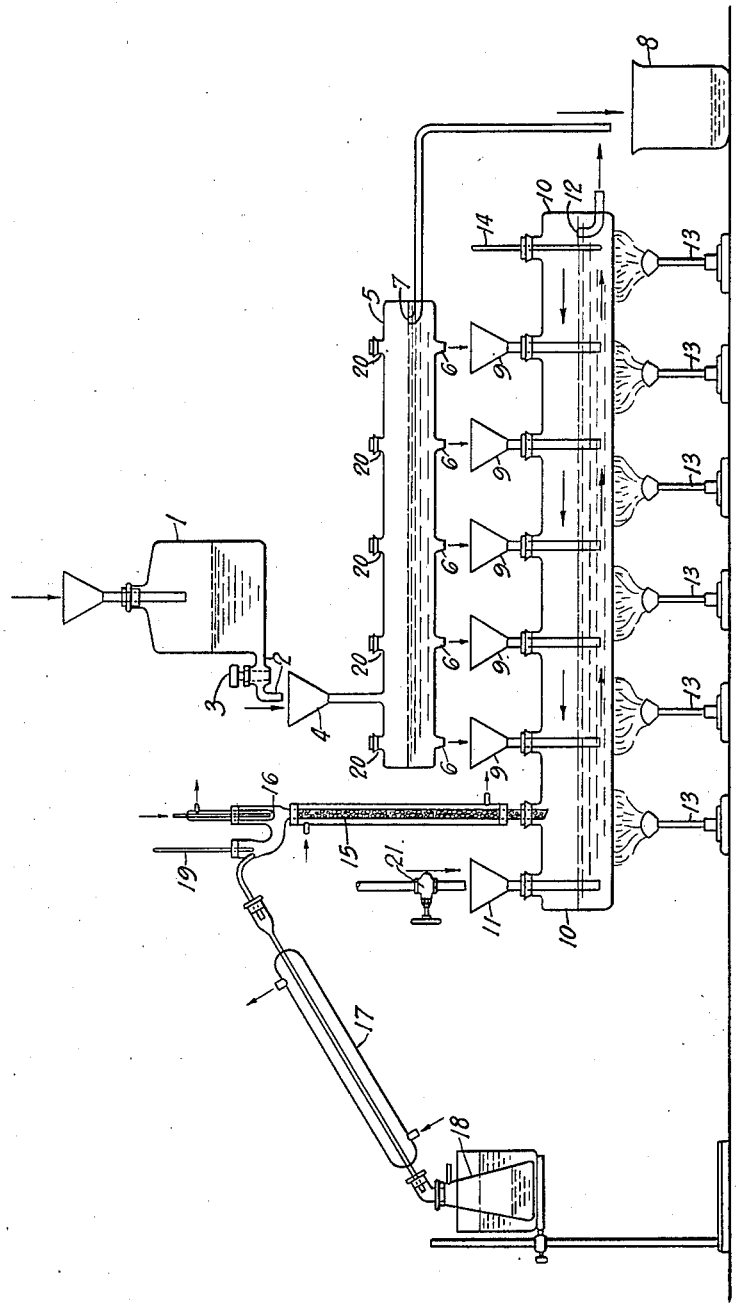
INVENTOR.
Kenneth E Stuart Patented Sept. 3, 1935

2,013,453

UNITED STATES PATENT OFFICE 2,013,453

CONTINUOUS HYDROLYZING PROCESS

Kenneth E. Stuart, Merion, Pa., assignor to Hooker Electrochemical Company, New York, N. Y., a corporation of New York Application July 19, 1934, Serial No. 735,958

18 Claims. (Cl. 260—156)

My invention relates to a process for continuously bringing together liquid reagents the reaction products of which tend to enter into secondary reactions among themselves or with the original reagents, thus retarding or inhibiting the primary reaction and lowering the yield of primary products. An example of such a reaction is to be found in the hydrolysis of alkylated acids, resulting in the formation of the corresponding alcohol, with restoration of the acid. The alcohol tends to react with the alkylated acid or restored acid to form the corresponding ether, especially when these respective reagents are in high concentration.

A specific illustration of the process of my invention is the production of ethyl alcohol by hydrolysis of ethyl sulphate, which may be either diethyl sulphate or ethyl hydrogen sulphate, in accordance with the equations:

(1) $(C_2H_5)_2SO_4 + H_2O = C_2H_5HSO_4 + C_2H_5OH$
(2) $C_2H_5HSO_4 + H_2O = C_2H_5OH + H_2SO_4$

In the presence of a high concentration of alcohol, however, the ethyl sulphate is liable to react with the alcohol to form ether in accordance with the equations:

(3) $C_2H_5HSO_4 + C_2H_5OH = (C_2H_5)_2O + H_2SO_4$
(4) $(C_2H_5)_2SO_4 + 2C_2H_5OH = 2(C_2H_5)_2O + H_2SO_4$

Also in the presence of strong sulphuric acid the alcohol is liable to be broken down into ether and water in accordance with the equation:

(5) $2C_2H_5OH + H_2SO_4 = (C_2H_5)_2O + H_2O + H_2SO_4$

When alcohol, rather than ether, is the primary product, precautions must be observed to minimize the occurrence of reactions (3), (4), and (5). One way in which to do this to add the ethyl sulphate slowly to boiling water, thus distilling off the alcohol as formed and allowing it no time to enter into these reactions. A process for accomplishing this is disclosed in co-pending application Serial No. 606,070, filed April 18, 1932. Another way of minimizing ether formation is to avoid high concentration of sulphuric acid; but as the acid is to be reconcentrated and reused, unless it is allowed to build up to a reasonable concentration the cost of reconcentration will be excessive. In order to serve both objects, i. e., to minimize ether formation and keep the cost of reconcentration within reasonable bounds, it has hitherto been thought necessary to effect the reaction by a batch operation, in which the ethyl sulphate is slowly added to boiling water and the process discontinued when the concentration of sulphuric acid in the water has reached a predetermined limit. At the start of such a batch process little or no ether is formed. At the finish of the operation a certain percentage of ether is formed, but the mean yield of alcohol is quite satisfactory and the cost of reconcentration moderate.

My invention, which is an improvement upon the process of the co-pending application referred to, has for its object to provide a continuous process without sacrificing the above mentioned advantages of the batch process.

In pursuance of this object, I admit the ethyl sulphate slowly at a plurality of points into a stream of preferably boiling water; thus the ethyl sulphate at the first point of admission encounters only fresh water, a condition corresponding to the start of the batch process, while the ethyl sulphate at the last point of admission encounters a condition no worse than that corresponding to the finish of the batch process. The resulting process has, therefore, all the usual advantages of continuous operation, combined with the high yield of batch operation.

In the drawing there is illustrated a laboratory set up, in glassware, of an apparatus for carrying out my process. 1 is the storage for ethyl sulphate, provided with a bottom discharge pipe 2, which may be closed by cock 3. The stream of ethyl sulphate from discharge pipe 2 is received by funnel 4 and conducted to the elongated receptacle 5, which may be of cylindrical shape. Receptacle 5 is provided with a plurality of orifices 6, 6 and an overflow 7. The function of the latter is to determine a constant head of liquid upon orifices 6. The stream of liquid entering receptacle 5 is regulated to supply orifices 6 and to provide a small excess, which overflows at 7 and is received in a container 8, from which it may be from time to time returned to storage 1. Obviously, in a large scale production a pump would be provided for this purpose.

The drip or stream from orifices 6 is received in funnels 9, 9 and conducted therefrom below the liquid level of an elongated reaction vessel 10, which may likewise be of a cylindrical shape. Into vessel 10, through funnel 11, from a source not shown, is admitted a stream of water which may be regulated by means of valve 21. Vessel 10 is likewise provided with an overflow 12, determining a constant level of liquid within this vessel. A series of Bunsen burners 13, 13 is provided to maintain the stream of liquid in vessel 10 at or above the distilling temperature of the alcohol.

The ethyl sulphate encountering the hot water is converted to alcohol and sulphuric acid in accordance with Equations (1) and (2). The concentration of sulphuric acid in vessel 10 builds up as the stream moves from left to right and the velocity of the stream is regulated so that at the overflow 12 it is of the predetermined limit of concentration, which may be of 50 per cent sulphuric acid. The boiling point of the liquid in vessel 10 of course increases with concentration of the acid. Near the overflow 12 there is provided a thermometer 14, by means of which the boiling point and concentration of the acid may be ascertained.

The alcohol and water vapor distilled from the liquid in vessel 10 flows counter-current over the surface to the inlet or cooler end of the stream and passes out through the reflux condenser 15, which may be filled with glass beads. A water cooled surface 16 is provided to prevent water vapor from passing this point. The alcohol vapor is then passed through condenser 17 to receptacle 18. A thermometer 19 is provided to check the temperature of the vapor at the exit from the reflux condenser.

Openings 20, 20 are provided, one directly above each orifice 6, to enable the orifices to be cleaned out by means of a wire, in case they should become obstructed.

A gas burner is provided well ahead of the first ethyl sulphate orifice to preheat the water before its first contact with ethyl sulphate. Similarly, a gas burner is provided well after the last orifice to ensure complete removal of alcohol by distillation.

The counterflow movement of the vapor over the surface of the liquid is of advantage, as it exercises a condensation effect tending to prevent water and acid from being carried back up-stream with the alcohol vapor.

Although the apparatus has been described in connection with ethyl alcohol, I do not wish to be limited thereto, as it is obviously suited to the production of other alcohols and, in short, to any process in which a condition is progressively built up in the body of reacting liquids tending to inhibit the desired reaction or set up undesirable secondary reactions.

Although the apparatus has been illustrated, for simplicity, as constructed from glassware, its adaptation to large scale production, in suitable materials of construction, such as glass-enamelled ware, will be obvious to anyone skilled in the art.

What I claim is:

1. The process for production of alcohols from alkylated acids which may be hydrolyzed in a water bath with formation of the corresponding alcohol and acid, and the alcohol of which can be distilled from the hydrolyzing bath of water and acid, which process comprises continuously introducing the alkylated acid by increments along a stream of water, continuously distilling off the alcohol formed and regulating the flow of water and alkylated acid to maintain within predetermined limits the final concentration of said acid in said stream.

2. The process for production of alcohols from alkylated acids which may be hydrolyzed in a water bath with formation of the corresponding alcohol and acid, and the alcohol of which can be distilled from the hydrolyzing bath of water and acid, which process comprises continuously introducing the alkylated acid by increments along a stream of water, applying heat to said stream at intervals along said stream to maintain said stream at or above the distilling temperature of the alcohol and increase the temperature of said stream as said distilling temperature increases with increasing concentration of said acid in said stream and regulating the flow of water and alkylated acid to maintain within predetermined limits the final concentration of said acid in said stream.

3. The process for production of alcohols from alkylated acids which may be hydrolyzed in a water bath with formation of the corresponding alcohol and acid, and the alcohol of which can be distilled from the hydrolyzing bath of water and acid, which process comprises continuously introducing the alkylated acid by increments along a stream of water, continuously distilling off the alcohol formed, conducting the vapors of alcohol in contact with the surface of and counter-current with respect to said stream, refluxing liquids entrained with the alcohol, condensing the alcohol and regulating the flow of water and alkylated acid to maintain within predetermined limits the final concentration of said acid in said stream.

4. The process for production of alcohols from alkylated acids which may be hydrolyzed in a water bath with formation of the corresponding alcohol and acid, and the alcohol of which can be distilled from the hydrolyzing bath of water and acid, which process comprises continuously introducing the alkylated acid by increments along a stream of water, continuously distilling off the alcohol formed and regulating the flow of alkylated acid and water to avoid any considerable concentration of alkylated acid in the water and to maintain within predetermined limits the final concentration of said acid in said stream.

5. The process for production of alcohols from alkylated acids which may be hydrolyzed in a water bath with formation of the corresponding alcohol and acid, and the alcohol of which can be distilled from the hydrolyzing bath of water and acid, which process comprises continuously introducing the alkylated acid by increments along a stream of water, continuously distilling off the alcohol formed and regulating the flow of alkylated acid and water to permit substantially complete hydrolysis of the alkylated acid between increments and to maintain within predetermined limits final concentration of said acid in said stream.

6. The process for production of alcohols from alkyl sulphates by hydrolysis in a water bath with formation of the corresponding alcohol and sulphuric acid, said alcohol being capable of distillation from the hydrolyzing bath of water and acid, which process comprises continuously introducing the alkyl sulphates by increments along a stream of water, continuously distilling off the alcohol formed and regulating the flow of water and alkyl sulphates to maintain within predetermined limits the final concentration of sulphuric acid in said stream.

7. The process for the production of alcohols from alkyl sulphates by hydrolysis in a water bath with formation of the corresponding alcohol and sulphuric acid, said alcohol being capable of distillation from the hydrolyzing bath of water and acid, which process comprises continually introducing the alkyl sulphates by increments along a stream of water, applying heat to said stream at intervals along said stream to maintain said stream at or above the distilling temperature of alcohol and to increase the temperature of said stream as said distilling temperature increases with increasing concentration of sulphuric acid in said stream and regulating the flow of water and alkyl sulphates to maintain within predetermined limits the final concentration of sulphuric acid in said stream.

8. The process for production of alcohols from alkyl sulphates by hydrolysis in a water bath with formation of the corresponding alcohol and sulphuric acid, said alcohol being capable of distillation from the hydrolyzing bath of water and sulphuric acid, which process comprises continuously introducing the alkyl sulphates by increments along a stream of water, continuously distilling off the alcohol formed, conducting the vapors of alcohol in contact with the surface of and counter-current with respect to said stream, refluxing liquids entrained with the alcohol, condensing the alcohol and regulating the flow of water and alkyl sulphates to maintain within predetermined limits the final concentration of sulphuric acid in said stream.

9. The process for production of alcohols from alkyl sulphates by hydrolysis in a water bath with formation of the corresponding alcohol and sulphuric acid, said alcohol being capable of distillation from the hydrolyzing bath of water and acid, which process comprises continuously introducing the alkyl sulphates by increments along a stream of water, continuously distilling off the alcohol formed and regulating the flow of alkyl sulphates and water to avoid any considerable concentration of alkyl sulphates in the water and to maintain within predetermined limits the final concentration of sulphuric acid in said stream.

10. The process for production of alcohols from alkyl sulphates by hydrolysis in a water bath with formation of the corresponding alcohol and sulphuric acid, said alcohol being capable of distillation from the hydrolyzing bath of water and acid, which process comprises continuously introducing the alkyl sulphates by increments along a stream of water, continuously distilling off the alcohol formed and regulating the flow of alkyl sulphates and water to permit substantially complete hydrolysis of the alkyl sulphates between increments and to maintain within predetermined limits the final concentration of sulphuric acid in said stream.

11. The continuous process for production of ethyl alcohol by hydrolysis of ethyl sulphates with formation of sulphuric acid which comprises continuously introducing the ethyl sulphates into a stream of water at intervals along said stream, distilling off the alcohol as formed and regulating the flow of ethyl sulphates and water to maintain within predetermined limits the final concentration of sulphuric acid in said stream.

12. The continuous process for production of ethyl alcohol by hydrolysis of ethyl sulphates with formation of sulphuric acid which comprises continuously introducing the ethyl sulphates into a stream of water at intervals along said stream while maintaining said stream at or above the distilling temperature of the alcohol and regulating the flow of ethyl sulphates and water to maintain within predetermined limits the final concentration of sulphuric acid in said stream.

13. The continuous process for production of ethyl alcohol by hydrolysis of ethyl sulphates with formation of sulphuric acid which comprises continuously introducing the ethyl sulphates into a stream of water at intervals along said stream, applying heat to said stream at intervals along said stream to maintain said stream at or above the distilling temperature of the alcohol and increase the temperature of said stream as said distilling temperature increases with increasing concentration of sulphuric acid in said stream and regulating the flow of ethyl sulphates and water to maintain within predetermined limits the final concentration of sulphuric acid in said stream.

14. The continuous process for production of ethyl alcohol by hydrolysis of ethyl sulphates with formation of sulphuric acid which comprises continuously introducing ethyl sulphates into a stream of substantially boiling water at intervals along said stream and regulating the flow of ethyl sulphates and water to maintain within predetermined limits the final concentration of sulphuric acid in said stream.

15. The continuous process for production of ethyl alcohol by hydrolysis of ethyl sulphates with formation of sulphuric acid which comprises continuously introducing ethyl sulphates into a stream of water at intervals along said stream, distilling off the alcohol as formed and regulating the flow of water relative to the ethyl sulphates to maintain the final concentration of sulphuric acid in the stream of water at substantially fifty per cent.

16. The continuous process for production of ethyl alcohol by hydrolysis of ethyl sulphates with formation of sulphuric acid which comprises continuously introducing ethyl sulphates into a stream of water at intervals along said stream, distilling off the alcohol as formed, conducting the vapors of alcohol in contact with the surface of and counter-current with respect to said stream, refluxing liquids entrained with the alcohol, condensing the alcohol and regulating the flow of ethyl sulphates and water to maintain within predetermined limits the final concentration of sulphuric acid in said stream.

17. The process which comprises continuously introducing ethyl sulphates by increments along a stream of water, continuously distilling off the ethyl alcohol formed as one product of the ensuing hydrolysis and regulating the flow of ethyl sulphates and water to avoid any considerable concentration of ethyl sulphates in the water and to maintain within predetermined limits the final concentration of sulphuric acid formed as another reaction product.

18. The process which comprises continuously introducing ethyl sulphates by increments along a stream of water, continuously distilling off the ethyl alcohol formed as one product of the ensuing hydrolysis and regulating the flow of ethyl sulphates and water to permit substantially complete hydrolysis of the ethyl sulphates between increments and to maintain within predetermined limits the final concentration of sulphuric acid formed as another product of the hydrolysis.

KENNETH E. STUART.